United States Patent
Cunningham et al.

(10) Patent No.: US 10,988,002 B2
(45) Date of Patent: Apr. 27, 2021

(54) VEHICLE ASSEMBLY AND METHOD TO REDUCE BUFFETING AND GENERATE DOWNFORCE

(71) Applicant: Ford Global Technologies, LLC, Dearborn, MI (US)

(72) Inventors: Andrew Thomas Cunningham, Royal Oak, MI (US); Matthew Arthur Titus, Livonia, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 16/561,451

(22) Filed: Sep. 5, 2019

(65) Prior Publication Data
US 2019/0389281 A1 Dec. 26, 2019

Related U.S. Application Data

(63) Continuation of application No. 15/716,592, filed on Sep. 27, 2017, now Pat. No. 10,457,122.

(51) Int. Cl.
| | |
|---|---|
| *B60J 9/00* | (2006.01) |
| *B60J 1/20* | (2006.01) |
| *B62D 35/00* | (2006.01) |
| *B60R 1/06* | (2006.01) |
| *F15D 1/12* | (2006.01) |

(52) U.S. Cl.
CPC .............. *B60J 1/20* (2013.01); *B60R 1/06* (2013.01); *B62D 35/008* (2013.01); *F15D 1/12* (2013.01)

(58) Field of Classification Search
CPC ......... B60T 8/1755; B60N 2/002; B60N 2/28; Y02T 10/40; Y02T 10/82; Y02T 10/88; B60K 28/16; B62D 37/02; B62D 35/007; B62D 35/005
See application file for complete search history.

(56) References Cited

U.S. PATENT DOCUMENTS

| | | | | |
|---|---|---|---|---|
| 4,196,930 A | * | 4/1980 | Busche | ..................... B60R 1/06 296/91 |
| 4,200,327 A | * | 4/1980 | Wepler | .................. B60J 1/2002 296/91 |

(Continued)

FOREIGN PATENT DOCUMENTS

JP 2000142493 5/2000

OTHER PUBLICATIONS

Aaron, John, Md. driver devised a $5 solution for 'wind throb', Washington's Top News, Aug. 15, 2016, retrieved from http://wtop.com/montgomery-county/2016/08/north-bethesda-porsche-owner-devises-solution-wind-throb/ on Mar. 17, 2017.

(Continued)

*Primary Examiner* — Kiran B Patel
(74) *Attorney, Agent, or Firm* — David Kelley, Esq.; Carlson, Gaskey & Olds, P.C.

(57) ABSTRACT

A vehicle flow influencing assembly includes, among other things, a downforce generator that extends laterally outward from an area of a vehicle, and that extends longitudinally from a leading edge portion to a trailing edge portion, the trailing edge portion aligned along a longitudinal axis of the vehicle with a side mirror of the vehicle, the downforce generator configured to influence flow to reduce buffeting.

17 Claims, 3 Drawing Sheets

(56) References Cited

U.S. PATENT DOCUMENTS

| | | | | |
|---|---|---|---|---|
| 4,449,796 A * | 5/1984 | Janssen | ............... | B60R 1/0602 359/507 |
| 4,462,303 A * | 7/1984 | Gebhard | ............... | B60H 1/248 454/134 |
| 4,511,170 A | 4/1985 | Sankrithi | | |
| 4,538,851 A * | 9/1985 | Taylor | ............... | B60R 1/06 296/180.1 |
| 4,840,475 A * | 6/1989 | Herzog | ............... | B60R 1/076 248/475.1 |
| 4,981,072 A * | 1/1991 | Hanson | ............... | B60H 1/248 359/838 |
| 5,150,941 A * | 9/1992 | Silzer | ............... | B60J 1/2002 296/152 |
| D427,127 S * | 6/2000 | Horowitz | ............... | D12/187 |
| 6,290,361 B1 * | 9/2001 | Berzin | ............... | B60R 1/0602 15/250.003 |
| 6,419,300 B1 * | 7/2002 | Pavao | ............... | B60R 1/06 296/152 |
| 6,702,448 B2 | 3/2004 | Tanaka | | |
| 6,712,413 B1 | 3/2004 | Flowerday | | |
| 7,318,619 B2 | 1/2008 | Munro et al. | | |
| 7,530,625 B2 * | 5/2009 | Gulker | ............... | B60R 1/06 296/1.11 |
| 7,621,588 B2 * | 11/2009 | Zhu | ............... | B60R 1/078 296/152 |
| 9,211,839 B2 * | 12/2015 | Zha | ............... | B60R 1/06 |
| 9,457,721 B2 * | 10/2016 | Takahashi | ............... | B60R 1/006 |
| 9,469,354 B1 * | 10/2016 | Ciccone | ............... | B62D 35/005 |
| 9,669,885 B1 * | 6/2017 | Fahland | ............... | B62D 37/02 |
| 9,957,000 B1 * | 5/2018 | Ehirim | ............... | B62D 35/02 |
| 10,029,746 B2 * | 7/2018 | Fahland | ............... | B62D 37/02 |
| 2003/0026008 A1 * | 2/2003 | Tanaka | ............... | B60R 1/06 359/838 |
| 2004/0056511 A1 * | 3/2004 | Flowerday | ............... | B60R 1/06 296/180.1 |
| 2011/0198885 A1 * | 8/2011 | Ilse | ............... | B62D 35/008 296/180.5 |
| 2015/0232138 A1 * | 8/2015 | Parry-Williams | ...... | B62D 37/02 296/180.5 |
| 2017/0088106 A1 * | 3/2017 | Fahland | ............... | B60T 8/1766 |
| 2017/0088193 A1 * | 3/2017 | Heil | ............... | B62D 35/00 |
| 2017/0088200 A1 * | 3/2017 | Heil | ............... | B62D 35/005 |
| 2017/0092022 A1 * | 3/2017 | Heil | ............... | B62D 35/005 |
| 2017/0096180 A1 * | 4/2017 | Dominguez | ............... | B62D 37/02 |
| 2017/0158257 A1 * | 6/2017 | Fahland | ............... | B62D 35/005 |
| 2017/0158258 A1 * | 6/2017 | Fahland | ............... | B62D 37/02 |
| 2017/0240221 A1 * | 8/2017 | Gaylard | ............... | B62D 35/007 |
| 2017/0240222 A1 * | 8/2017 | Gaylard | ............... | B62D 35/008 |
| 2017/0240223 A1 * | 8/2017 | Gaylard | ............... | B62D 35/005 |
| 2017/0297636 A1 * | 10/2017 | Shinedling | ............... | B62D 35/007 |
| 2017/0361882 A1 * | 12/2017 | Weber | ............... | B62D 35/007 |
| 2018/0051859 A1 * | 2/2018 | Scervo | ............... | F21S 45/47 |
| 2019/0016396 A1 * | 1/2019 | Sylvester | ............... | B62D 25/12 |

OTHER PUBLICATIONS

Voelcker, John, Chevy Volt's Wind Thrumming Noise: Aero Fix Now Available, Dec. 9, 2013, retrieved from http://www.greencarreports.com/news/1088990_chevy-volts-wind-thrumming-noise-aero-fix-now-available.

* cited by examiner

VEHICLE ASSEMBLY AND METHOD TO REDUCE BUFFETING AND GENERATE DOWNFORCE

CROSS-REFERENCE TO RELATED APPLICATIONS

This application is a continuation of U.S. patent application Ser. No. 15/716,592, which was filed on 27 Sep. 2017 and is incorporated herein by reference in its entirety.

TECHNICAL FIELD

This disclosure relates generally to influencing flow around a vehicle to reduce buffeting. In particular, the disclosure relates to reducing buffeting with an assembly that also generates a downforce on the vehicle.

BACKGROUND

Buffeting (i.e., wind throb) can occur when a window of a vehicle is opened while the vehicle is moving. Buffeting is typically a high decibel, low frequency, throbbing sound. Buffeting can be objectionable to occupants within a passenger compartment of the vehicle. To address buffeting, some vehicles incorporate structures that influence flow over an open window.

SUMMARY

A vehicle flow influencing assembly according to an exemplary aspect of the present disclosure includes, among other things, a downforce generator that extends laterally outward from an area of a vehicle, and that extends longitudinally from a leading edge portion to a trailing edge portion, the trailing edge portion aligned along a longitudinal axis of the vehicle with a side mirror of the vehicle, the downforce generator configured to influence flow to reduce buffeting.

In a further non-limiting embodiment of the foregoing assembly, the downforce generator includes an airfoil.

In a further non-limiting embodiment of any of the foregoing assemblies, the downforce generator includes a dive plane.

In a further non-limiting embodiment of any of the foregoing assemblies, the area is a window sail.

In a further non-limiting embodiment of any of the foregoing assemblies, the area is vertically above a beltline of the vehicle and the side window is a front side window.

In a further non-limiting embodiment of any of the foregoing assemblies, the downforce generator is laterally between a side mirror and a side window opening of the vehicle.

In a further non-limiting embodiment of any of the foregoing assemblies, the assembly includes a gurney flap and a base of the downforce generator, the gurney flap extending vertically from the base.

In a further non-limiting embodiment of any of the foregoing assemblies, gurney flap is at a lateral side of the base.

In a further non-limiting embodiment of any of the foregoing assemblies, the gurney flap is at a rear of the base relative to an orientation of the vehicle.

In a further non-limiting embodiment of any of the foregoing assemblies, the gurney flap includes both a side gurney flap at a lateral side of the base, and a rear gurney flap at a rear of the base relative to an orientation of the vehicle.

In a further non-limiting embodiment of any of the foregoing assemblies, the base is canted twenty degrees or less relative to a horizontal axis such that a rear end of the base is vertically higher than a front end of the base.

In a further non-limiting embodiment of any of the foregoing assemblies, the leading edge portion is aft an A-pillar of the vehicle and spaced a distance from the A-pillar along the longitudinal axis of the vehicle.

In a further non-limiting embodiment of any of the foregoing methods, the base is canted twenty degrees or less relative to a horizontal axis such that a rear end of the base is vertically higher than a front end of the base.

In a further non-limiting embodiment of any of the foregoing assemblies, the downforce generator is vertically directly above a mirror arm that supports the side mirror.

In a further non-limiting embodiment of any of the foregoing assemblies, the leading edge portion is disposed vertically between a vertically uppermost part of the side mirror and a vertically lowermost part of the side mirror. The trailing edge portion is disposed vertically between the vertically uppermost part of the side mirror and the vertically lowermost part of the side mirror.

In a further non-limiting embodiment of any of the foregoing assemblies, the downforce generator is aligned along the longitudinal axis with a mirror arm, the mirror arm directly supporting the side mirror.

In a further non-limiting embodiment of any of the foregoing assemblies, a portion of the mirror arm extends along the longitudinal axis to a position that is forward of the leading edge portion of the downforce generator and another portion of the mirror arm extends along the longitudinal axis to a position that is aft of the trailing edge portion of the downforce generator.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to flow influencing assemblies incorporated into a vehicle. The flow influencing assemblies are positioned in an area of the vehicle that is forward a side window. When the side window is open, the flow influencing assembly redirects and disrupts flow across the opening to reduce buffeting. The flow influencing assembly also generates downforce.

Figure 1:
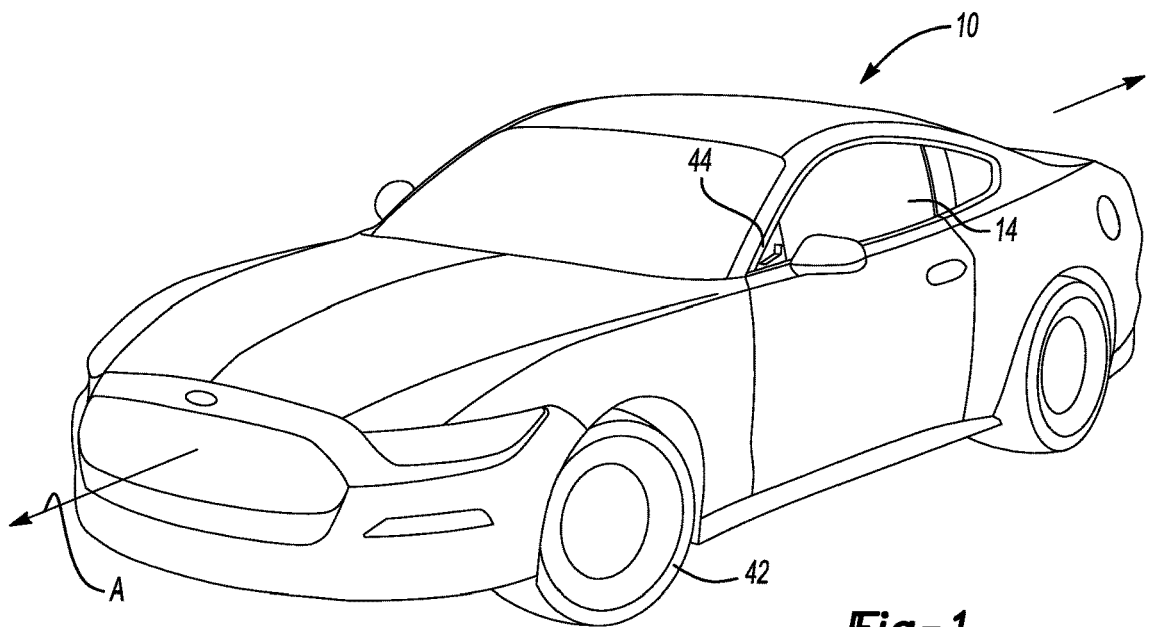
FIG. 1 shows a perspective view of an example vehicle including a downforce generator on a driver side and another downforce generator on a passenger side.
Figure 2:
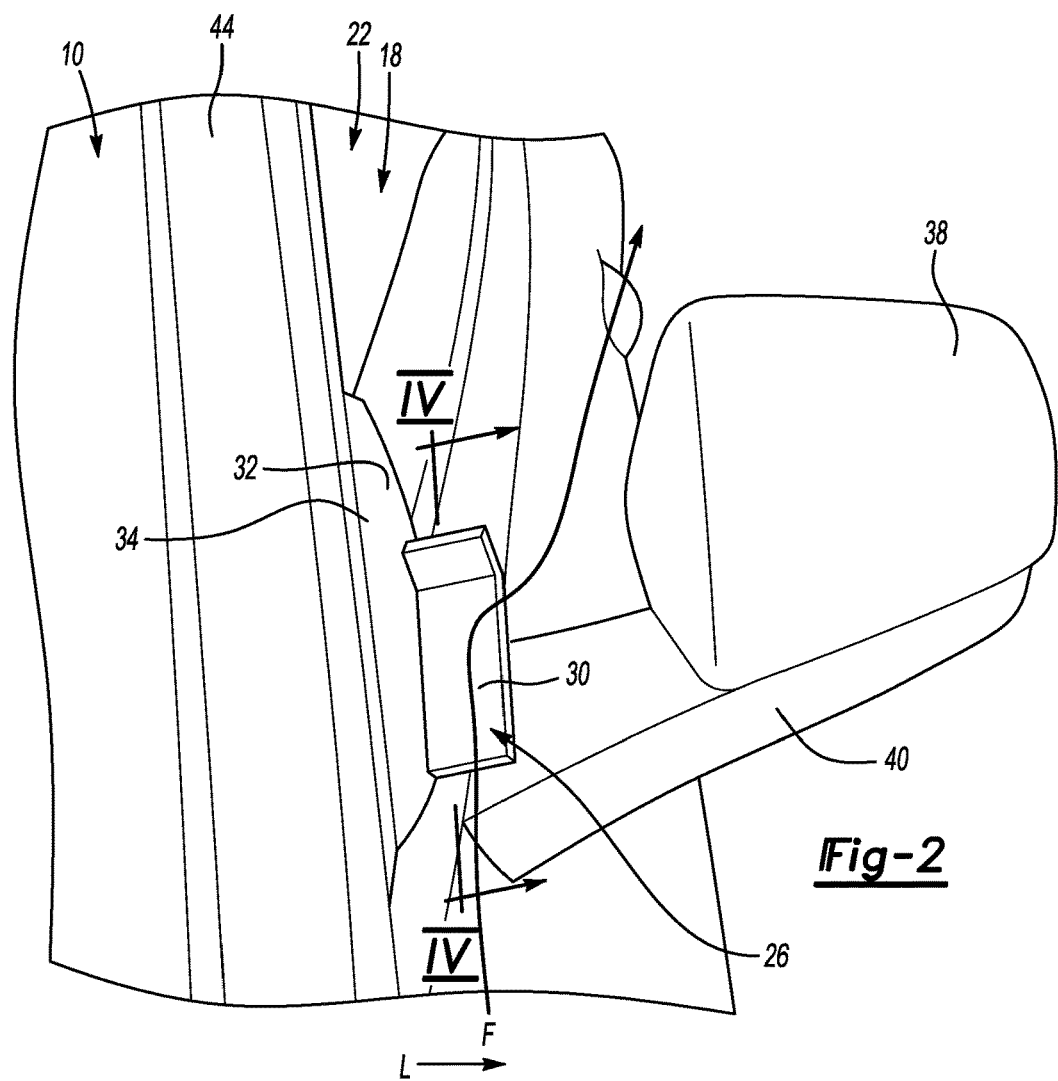
FIG. 2 shows a top view of a driver side downforce generator from the vehicle of FIG. 1.
Figure 3:
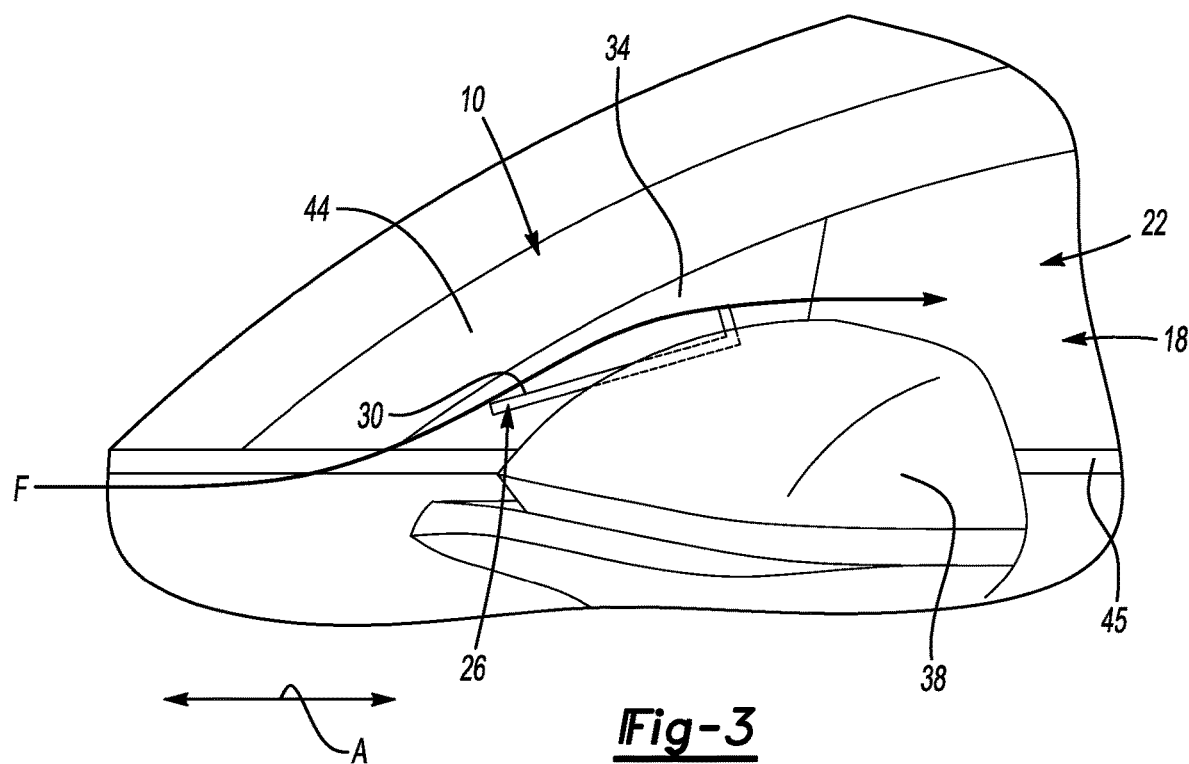
FIG. 3 shows a side view of the downforce generator of FIG. 2.
Figure 4:
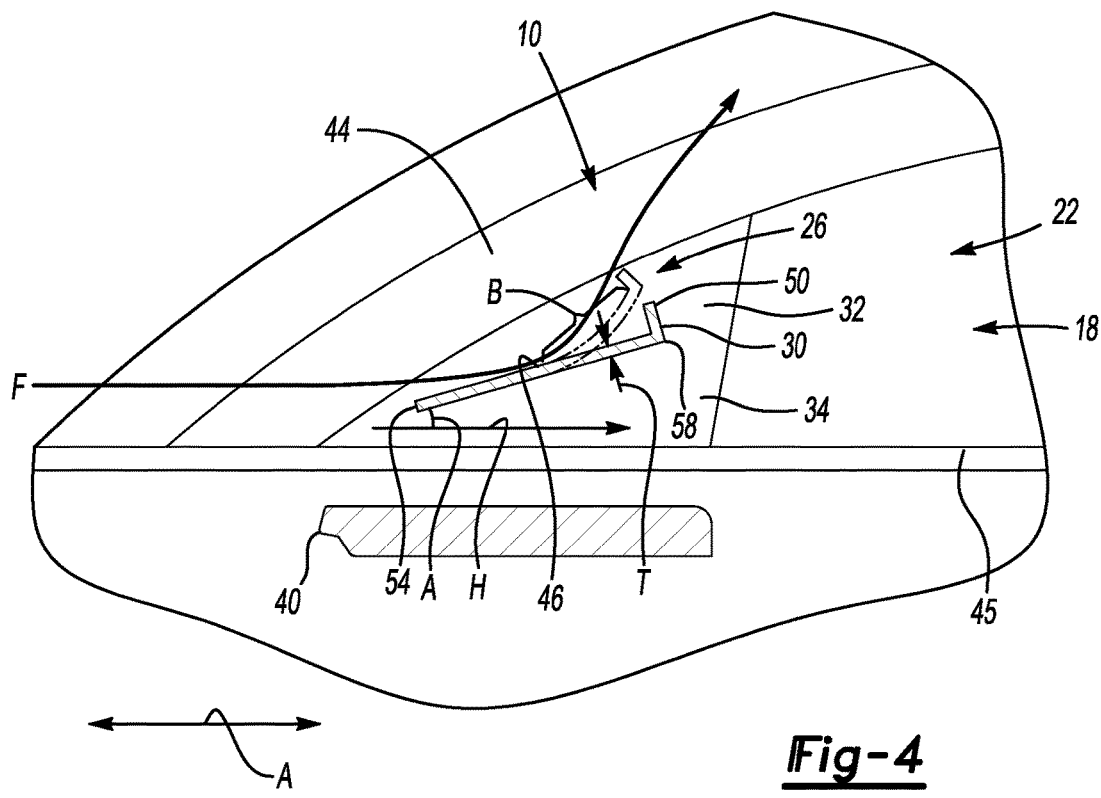
FIG. 4 is a section view taken along line IV-IV in FIG. 2.

Referring to FIGS. 1-4, an example vehicle 10 includes a front side window 14. The side window 14 is closed in FIG. 1. In FIGS. 2-4, the side window 14 is fully open to provide an opening 18 to a passenger compartment 22 of the vehicle 10. The side window 14 also provides the opening 18 to the passenger compartment 22 when the side window 14 is partially open.

Driving the vehicle 10 when the side window 14 is in the open, or partially open, position can cause an occupant within the passenger compartment 22 of the vehicle 10 to experience buffeting noise. Buffeting noise is typically a high decibel, low frequency, throbbing sound resulting from the Helmholtz resonator phenomenon associated with a flow F of air passing over the opening 18 as the vehicle 10 is driven. Relatively extreme buffeting can produce pressure waves that move to the passenger compartment and cause physical discomfort to the passengers.

To reduce buffeting, the vehicle 10 incorporates a flow influencing assembly 26 comprising a downforce generator 30. The downforce generator 30 reduces buffeting by disrupting the flow F over the opening 18 as the vehicle 10 is driven with the side window 14 open, or partially open.

Initially, flow F moves over a hood of the vehicle 10 and then encounters the windshield, which forces flow F to wrap around an A-pillar of the vehicle 10 and move toward the opening 18. This flow F, if not deflected, can oscillate between entering the opening 18 and attaching to the exterior surface of the vehicle 10 aft of the opening 18. This oscillation causes buffeting.

In this exemplary non-limiting embodiment, the downforce generator 30 extends laterally outward in a direction L (FIG. 2) from a driver side window sail 34. The downforce generator 30 redirects the flow F such that more of the flow F stays attached to the vehicle 10 aft the opening 18, and does not enter the passenger compartment 22 through the opening 18. Keeping more of the flow attached to the exterior of the vehicle 10 rather than entering the opening 18 can reduce buffeting.

The exemplary downforce generator 30 extends about 0.5 inches (1.27 centimeters) from a primary outer surface 32 of the window sail 34. The downforce generator 30 is thus in an area of the vehicle 10 that is forward the side window 14 and the opening 18. In particular, the exemplary downforce generator 30 is positioned laterally between a driver side mirror 38 and the window sail 34.

In another example, the downforce generator 30 extends laterally inward from the driver side mirror, or is disposed on a mirror arm 40.

In the exemplary embodiment, the downforce generator 30 is aft a set of front wheels 42 of the vehicle 10 relative to a longitudinal axis A of the vehicle 10, and directly aft an A-pillar 44 of the vehicle 10. The downforce generator 30 is, in particular, aligned along the longitudinal axis A with the window sail 34, the driver side mirror 38, and the mirror arm 40.

The downforce generator 30 is positioned vertically above a beltline 45 of the vehicle 10. This positioning can facilitate the downforce generator 30 influencing the flow F across the opening 18 when the side window 14 is lowered. In particular, the downforce generator 30 is vertically above the mirror arm 40, and vertically aligned with both the window sail 34 and the driver side mirror 38.

The downforce generator 30 is shown on a driver side of the vehicle 10. The passenger side of the vehicle 10 includes a similar downforce generator extending from, for example, a passenger side window sail that is forward a passenger side window of the vehicle 10.

Some vehicles, especially high-performance vehicles, incorporate downforce generators to improve aerodynamic grip during, for example, cornering. These downforce generators are typically incorporated as wings at the forward end, aft end, or both of the vehicle. These downforce generators do not influence flow such that buffeting is reduced.

The example vehicle 10 is a two-door, but the downforce generator 30 could be incorporated into other types of vehicles, such as four-door vehicles.

The downforce generator 30, in this exemplary non-limiting embodiment, includes a base 46 and a gurney flap 50. The base 46 extends along the longitudinal axis A of the vehicle 10 from a leading edge portion 54 to a trailing edge portion 58. The gurney flap 50 extends transversely from the base 46 in a vertical direction. In this example, the gurney flap 50 extends from the trailing edge portion 58 of the base 46.

The base 46 is canted relative to a horizontal axis. Horizontal and vertical, for purposes of this disclosure, is with reference to ground refers and the general orientation of the vehicle 10 with the downforce generator 30 when driving or at rest.

In particular, the trailing edge portion 58 is raised relative to the leading edge portion 54 such that the base 46 is canted an angle A relative to a horizontal axis H. In this example, the angle A is about twenty degrees. In other examples, the angle A is 20 degrees or less.

The angle A could be higher if, for example, an aft section the downforce generator 30 is gradually curved upward to facilitate attaching air to the vehicle 10 aft of the opening 18. Broken lines B in FIG. 4 represent an example of an aft section curved upward. If such curvature is present, the angle A of the aft portion of the downforce generator 30 could be approximately forty-five degrees from horizontal, however, the forward portion of the downforce generator 30 would still be between zero and twenty degrees.

The downforce generator 30 is, in this exemplary non-limiting embodiment, a dive plane with the base 46 having a generally rectangular cross-sectional profile as shown in FIG. 4. Generally, in this disclosure, a dive plane is a structure with generally constant thickness, and a generally rectangular cross-section profile, that is positioned such that the plane faces an oncoming flow of air. When viewed from above, the dive plane could have a rectangular profile, or a wedge (i.e. triangular) profile.

In this embodiment, a thickness T of the base 46 can be from 3 to 5 millimeters, for example. This thickness can provide the rigidity required to redirect the flow F and facilitate molding the base 46.

Because the downforce generator 30 is a dive plane, the downforce generator 30 produces a downforce on the vehicle 10 when the vehicle 10 is driven forward. The downforce is a result of the downforce generator 30 deflecting of the flow F of oncoming air vertically upward. The downforce, due to the position of the downforce generator 30, is applied near front wheels 42 of the vehicle 10, which can, among other things, improve traction.

The downforce generator 30, when paired with a downforce generator on the passenger side of the vehicle 10, can, in some exemplary embodiments, generate sufficient downforce to reduce a lift coefficient for the vehicle 10 by up to 0.007. Some other pairs of downforce generators that are optimized to generate downforce can reduce the lift coefficient by as much as 0.020.

The downforce generator 30 in this embodiment can be a polymer-based material that is molded together with the window sail 34. The downforce generator 30 is relatively rigid, which facilitates generating the downforce. That is, the downforce generator 30 does not move, flex, or flap significantly in response to the oncoming flow F.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 5:
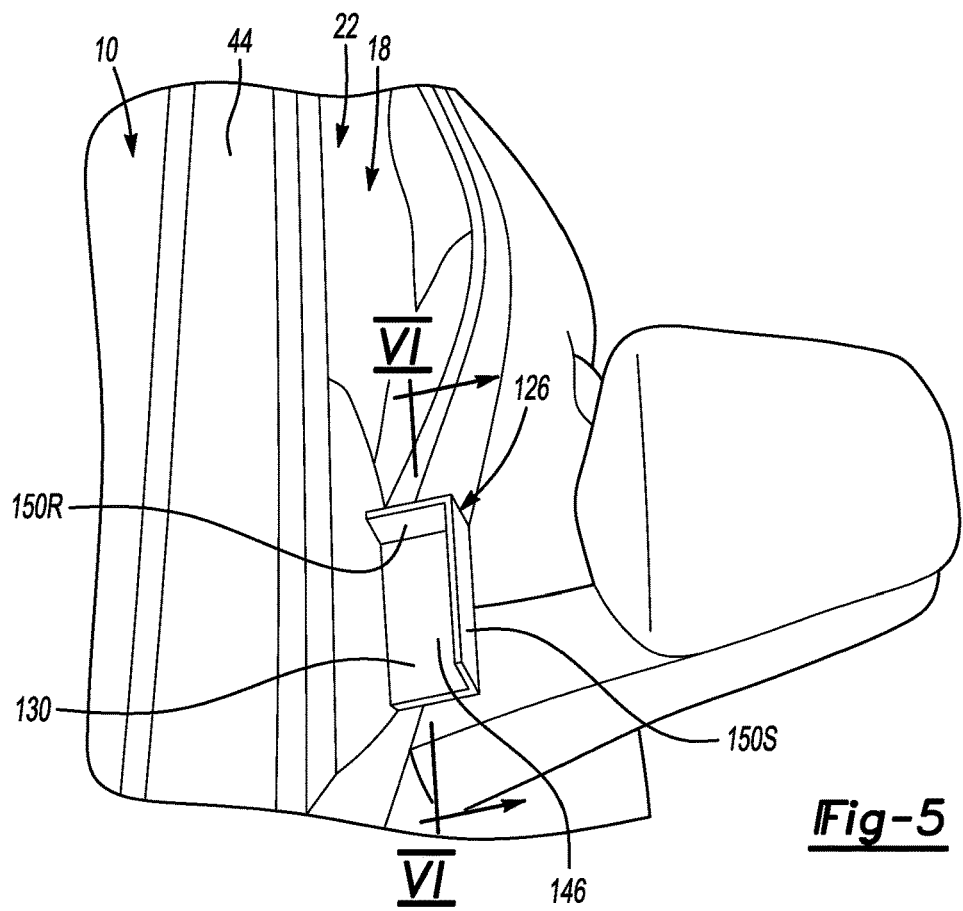
FIG. 5 shows a perspective view of a downforce generator for use in the vehicle of FIG. 1 according to another exemplary embodiment.

Referring now to FIG. 5 with continuing reference to FIG. 1, another example flow influencing assembly 126 includes a downforce generator 130 having a base 146. A rear gurney flap 150R extends vertically upward from a trailing edge portion 158 of the base 146. A side gurney flap 150S extends vertically upward from a laterally outboard side of the base 146. The rear gurney flap 150R is aligned along a first plane. The side gurney flap 150S is aligned along a second plane that is transverse to the side plane. In this specific example, the first plane is offset ninety-degrees from the second plane.

The gurney flap 150R can influence flow to reduce buffeting and generate downforce when the vehicle 10 is driven forward. The gurney flap 150S can influence flow to reduce buffeting and generate downforce, especially when the vehicle 10 is in yaw (i.e., cornering) while moving.

Figure 6:
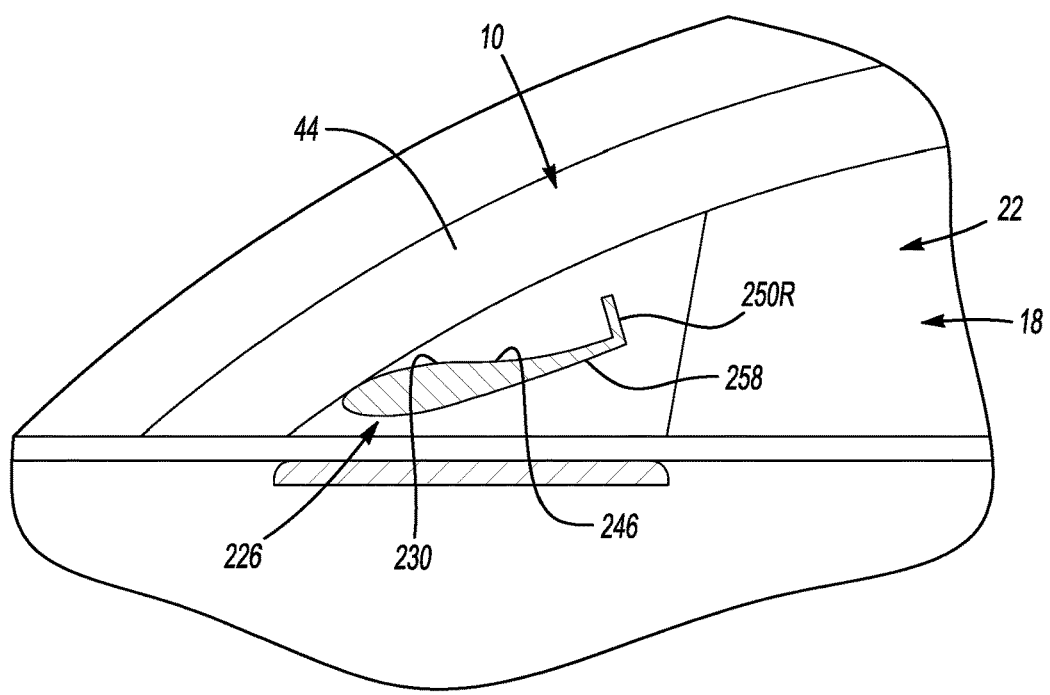
FIG. 6 shows a section view of a downforce generator according to yet another exemplary embodiment.

Referring now to FIG. 6 with continuing reference to FIG. 1, another example flow influencing assembly 226 includes a downforce generator 230 having a base 246 and a rear gurney flap 250R extending from a trailing edge portion 258 of the base 246.

The base 246 of the downforce generator 230 has an airfoil shape. The downforce generator 230 can thus be considered an airfoil. The airfoil profile can, in some examples, facilitate influencing flow over the opening 18 while additionally generating downforce on the vehicle 10. The base 246 having the airfoil shape has and angle of attack that is from zero to thirty degrees relative to a horizontal axis. The downforce generator 230 having the airfoil shape would be paired with other downforce generators extending from the same window sail. The other downforce generators could have a smaller cross sectional area than the downforce generator 230, for example.

The downforce generator 230 could, if desired, incorporate a side gurney flap like the side gurney flap 150S of the downforce generator 130 (FIG. 5).

The downforce generator 230 is positioned on the vehicle 10 in the same area as the downforce generators 30 and 130. Like the downforce generators 30 and 130, the downforce generator 230 extends laterally from the primary outer surface 32 of the driver side window sail 34 about 0.5 inches (1.27 centimeters).

Generating downforce with the downforce generators 30, 130, and 230 can facilitate grip and traction of the vehicle 10. The downforce generator 30, 130, and 230 are particularly appropriate for high-performance vehicles where generating downforce is desired, especially when cornering.

Although the exemplary embodiments described the area of the vehicle 10 that is forward the side window having a single one of the downforce generators 30, 130, and 230, other numbers could be used. For example, the window sail 34 of FIGS. 1-4 could include the downforce generator 30 and a second downforce generator extending laterally from the window sail 34.

The downforce generator 30 of FIGS. 1-4 has been found to reduce buffeting, in some examples, from a max in-cabin volume of 110.8 decibels to about 106.4 decibels. The downforce generator 130 (with the side gurney flap 150S) has been found to reduce buffeting, in some examples, from 110.8 decibels to about 104.1 decibels.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle flow influencing assembly, comprising:
a downforce generator that extends laterally outward from an area of a vehicle, and that extends longitudinally from a leading edge portion to a trailing edge portion, the trailing edge portion aligned along a longitudinal axis of the vehicle with a side mirror of the vehicle, the downforce generator configured to influence flow to reduce buffeting.

2. The vehicle flow influencing assembly of claim 1, wherein the downforce generator includes an airfoil.

3. The vehicle flow influencing assembly of claim 1, wherein the downforce generator includes a dive plane.

4. The vehicle flow influencing assembly of claim 1, wherein the area is a window sail.

5. The vehicle flow influencing assembly of claim 1, wherein the area is vertically above a beltline of the vehicle and the side window is a front side window.

6. The vehicle flow influencing assembly of claim 1, wherein the downforce generator is laterally between the side mirror and a side window opening of the vehicle.

7. The vehicle flow influencing assembly of claim 1, further comprising a gurney flap and a base of the downforce generator, the gurney flap extending vertically from the base.

8. The vehicle flow influencing assembly of claim 7, wherein gurney flap is at a lateral side of the base.

9. The vehicle flow influencing assembly of claim 7, wherein the gurney flap is at a rear of the base relative to an orientation of the vehicle.

10. The vehicle flow influencing assembly of claim 7, wherein the gurney flap extends longitudinally in a direction that extends laterally outward from the vehicle.

11. The vehicle flow influencing assembly of claim 7, wherein the gurney flap comprises both a side gurney flap at a lateral side of the base, and a rear gurney flap at a rear of the base relative to an orientation of the vehicle.

12. The vehicle flow influencing assembly of claim 7, wherein the base is canted twenty degrees or less relative to a horizontal axis such that a rear end of the base is vertically higher than a front end of the base.

13. The vehicle flow influencing assembly of claim 1, wherein the leading edge portion is aft an A-pillar of the vehicle and spaced a distance from the A-pillar along the longitudinal axis of the vehicle.

14. The vehicle flow influencing assembly of claim 1, wherein the downforce generator is vertically directly above a mirror arm that supports the side mirror.

15. The vehicle flow influencing assembly of claim 1, wherein the leading edge portion is disposed vertically between a vertically uppermost part of the side mirror and a vertically lowermost part of the side mirror, wherein the trailing edge portion is disposed vertically between the vertically uppermost part of the side mirror and the vertically lowermost part of the side mirror.

16. The vehicle flow influencing assembly of claim 1, wherein the downforce generator is aligned along the longitudinal axis with a mirror arm, the mirror arm directly supporting the side mirror.

17. The vehicle flow influencing assembly of claim 16, wherein a portion of the mirror arm extends along the longitudinal axis to a position that is forward of the leading edge portion of the downforce generator and another portion of the mirror arm extends along the longitudinal axis to a position that is aft of the trailing edge portion of the downforce generator.

* * * * *